Jan. 22, 1957    L. S. CORCORAN    2,778,528
SHOT MEASURING DEVICE

Filed June 21, 1954    2 Sheets-Sheet 1

LYLE S. CORCORAN,
INVENTOR.

BY Lynn Latta

ATTORNEY

Jan. 22, 1957   L. S. CORCORAN   2,778,528
SHOT MEASURING DEVICE
Filed June 21, 1954   2 Sheets-Sheet 2

LYLE S. CORCORAN,
INVENTOR.

BY Lynn H Latta
ATTORNEY

United States Patent Office 2,778,528
Patented Jan. 22, 1957

2,778,528

SHOT MEASURING DEVICE

Lyle Shellman Corcoran, Hollywood, Calif.

Application June 21, 1954, Serial No. 438,260

6 Claims. (Cl. 222—46)

The invention relates to a device for dispensing a pre-selected volumetric quantity of shot upon each successive cycle of operation of the dispensing device.

The principal object of the invention is to provide a device for dispensing a pre-selected volumetric quantity of shot without incurring any severing or other mutilation of the shot during the dispensing operation.

Another object of the invention is to provide such a dispensing device wherein jamming of the device during operation thereof is prevented.

Other objects and advantages of the invention will be apparent from the ensuing specification and the appended drawings in which.

Figure 2:
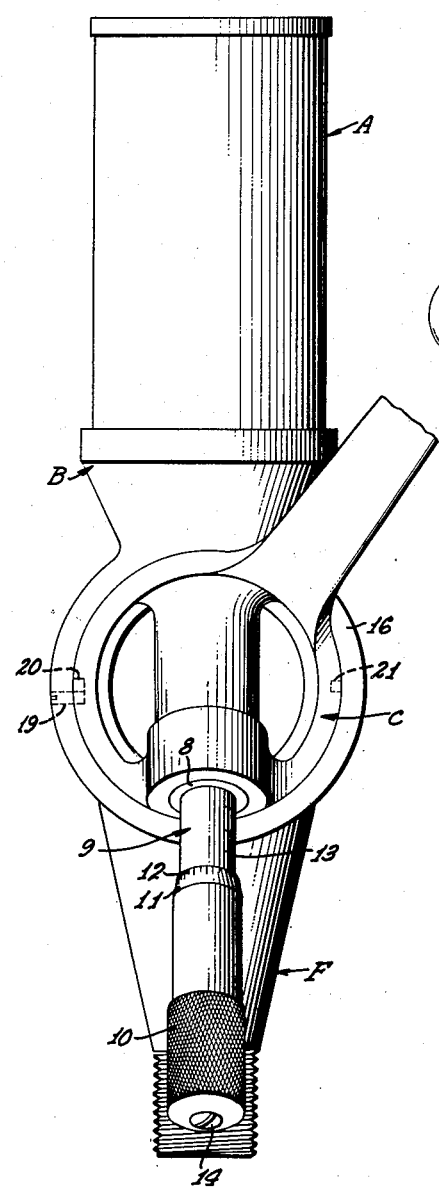
Fig. 2 is a rear view of the device.

In general, the shot measuring apparatus includes a hopper A fastened to a casing B including a cylindrical bearing for rotatably supporting a valve C which has a measuring cylinder D provided with an adjustable piston E for varying its volumetric capacity so as to dispense a measured quantity of shot through a dispensing nozzle F which formed at the lower end of the casing B.

The hopper A may be threaded into the upper end of the casing B, the latter being formed with a receiving chamber 1 having a frusto-conical internal wall 2 which terminates with a discharge opening 3 at its lower end, the perimeter of said opening being in close association with the cylindrical external wall 4 of the valve C. The interior of the valve may be hollow so as to accommodate the inclined measuring cylinder D. Cylinder D has a cylindrical chamber 5 in one end of which is defined the measuring chamber. The piston E has a circular head 6 (see Figs. 3, 4 and 5) which has a close sliding fit with the internal cylindrical wall of the chamber 5 and which has an externally threaded shank 7 in threaded engagement with the head portion 8 of the sleeve 9. The cylindrical cap 10 is telescoped over the sleeve 9 and is rotatable thereon and the tapered end 11 thereof may have its perimeter provided with indicia 12 for reading against the indicia 13 which are inscribed along the length of the sleeve 9. The shank 7 of the piston is secured to the cap 10 as by means of a screw 14 and rotation of the cap moves the piston in an axial direction within the cylindrical chamber 5 to any preselected position therein and the area in the chamber 5 above the piston head 6 (measuring chamber) determines the quantity of shot which will be rotated along with the valve and discharged into the throat 15 within the discharge nozzle F. It will be understood that the casing B has the circular boss 16 formed in the central region thereof, the internal surface of boss 16 being cylindrical and closely fitted to the external cylindrical surface 4 of the valve C, and the internal wall of the boss having the opening 3 for communicating with the chamber 5 and the discharge opening 17 which opens into the interior of the nozzle. The valve has an annular groove 18 formed near one margin thereof. A pin 19 (see Fig. 2) may be fixed in the boss 16 and project into the groove 18 of the valve to prevent the valve from moving axially within the cylindrical bore in the boss 16 but permitting rotation of the valve throughout an arc of 180 degrees, the pin 20 engaging the pin 19 when the valve is rotated to the loading position as shown in Fig. 1 and the pin 21 engaging the opposite side of pin 19 when the valve is rotated 180 degrees to discharge position (in this position the mouth 22 at the upper end of the measuring chamber will be in communication with the opening 17 in the internal wall in casting B).

Figure 1:
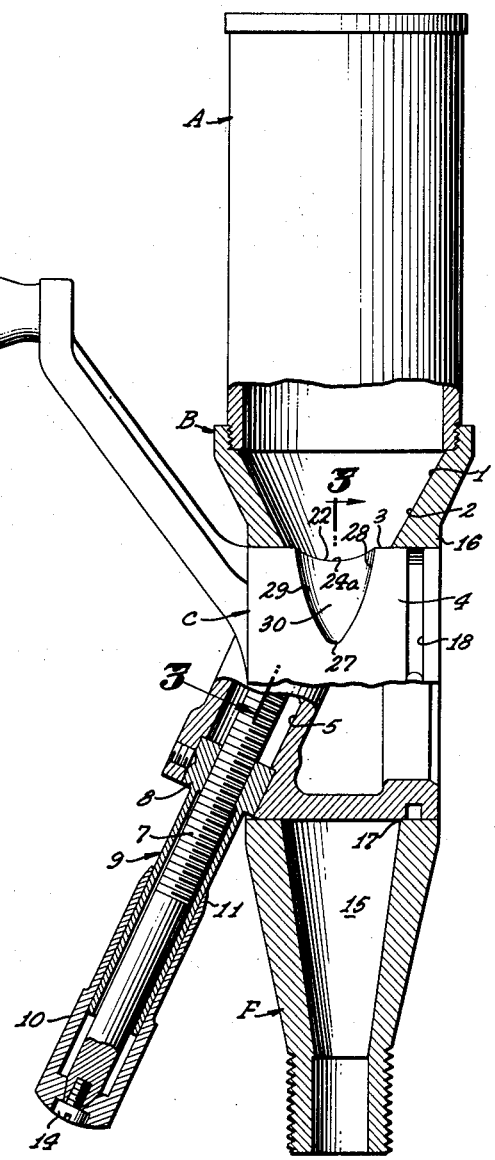
Fig. 1 is a side elevational view, partly in section of the shot measuring and dispensing device.

When the valve is rotated to the loading position as shown in Figs. 1 and 2, the mouth 22 of the measuring chamber will be directed substantially vertically upwardly and exposed to the discharge opening 3 of the hopper chamber 2, the shot which is stored within the hopper A will immediately flow into the measuring chamber above the piston head 6 and an accurately measured quantity of shot will be trapped therein. In the prior art device the rearward side 24 of the mouth 22a presents a sharp edge which conforms throughout its entire extent to the cylindrical internal wall within the boss 16 and when this rearward perimeter edge meets with the forward portion 25 of the hopper opening 3 there are two sharp edges approaching each other in a common circumferential path with a shearing action and if one or more of the shot pellets 26 is positioned so as to be projecting partly into the measuring chamber below the circumferential path of the external wall of the valve and projecting partly above such circumferential path, then this or these pellets will become wedged between the sharp edges 24 and 25 of the valve and hopper and are usually sheared or otherwise mutilated as the rearward edge 24 of the valve passes the forward edge 25 of the hopper mouth. These severed pellets are carried along with the other pellets and discharged through the discharge nozzle 15. It is undesirable when reloading, for example, a shell for use in a shotgun, to utilize the shot pellets, a few of which would be mutilated or otherwise severed. Consequently, I have provided a recess or groove 30 in the external wall of the valve which commences at the rear edge 24a of the mouth 22 a predetermined depth below the external surface of the valve, said recess receding from the chamber 5 in a circumferential direction about the external surface of the valve, with gradually decreasing depth, and merges at the location 27 (see Fig. 1). The recess 30, from one side edge 28 to the opposite side edge 29 thereof, is of segmental circular cross section, and the side edges 28 and 29 thereof converge toward each other until they meet at the juncture point 27.

Figure 4:
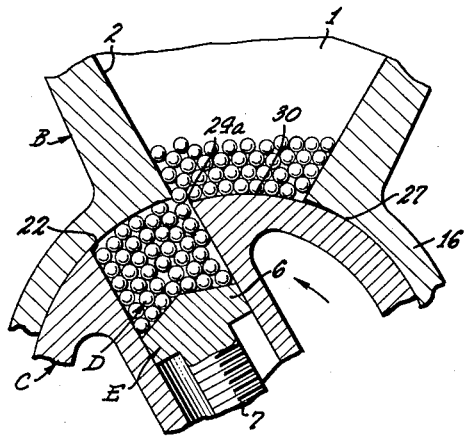
Fig. 4 is a fragmentary enlarged sectional view similar to Fig. 3 but showing the drum partially rotated in dispensing direction.
Figure 3:
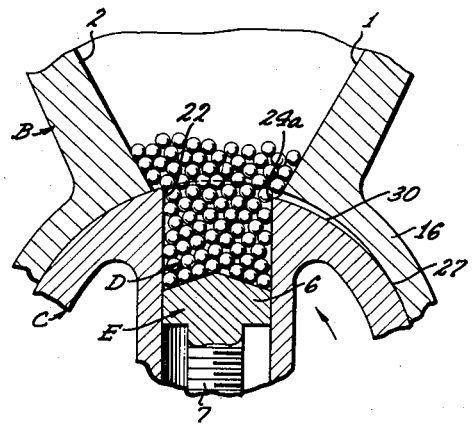
Fig. 3 is a fragmentary sectional view taken on the line 3—3 of Fig. 1 with the measuring drum in loading position.
Figure 5:
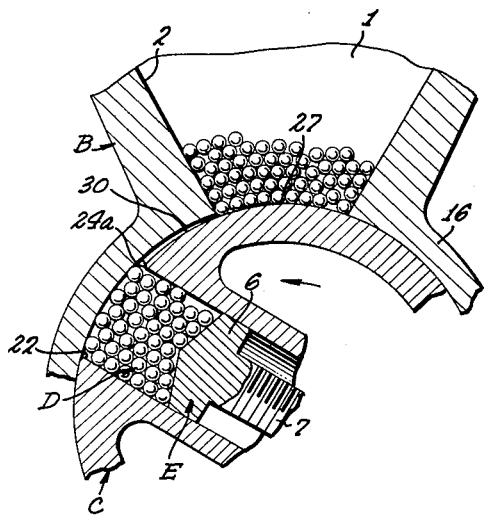
Fig. 5 is another fragmentary enlarged sectional view similar to Fig. 3 and showing the drum as having been rotated still further than in Fig. 4.
Figure 6:
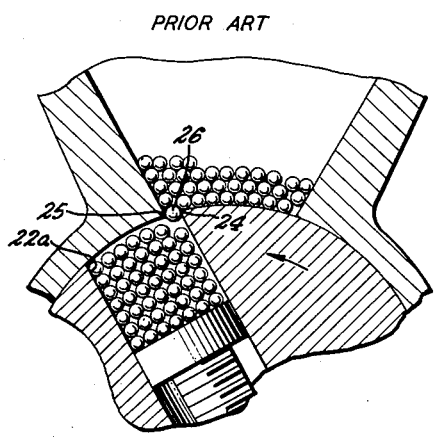
Fig. 6 is a fragmentary sectional view showing the prior art device for measuring shot.

At first blush it would appear that any of the pellets which are positioned within this recess during the period of rotation of the valve in which the recess is exposed to the hopper mouth (as shown in Fig. 4) would tend to remain in the recess and become wedged between the internal cylindrical wall of the boss 16 and the floor of the recess, however, this does not occur, since the diameter of any one of the pellets is greater than the greatest depth of the recess (the greatest depth of the recess being at the juncture of the forward edge 24a and the longitudinal center line of the groove) and apparently because of the rolling action of the pellets (which are usually substantially spherical) as the valve is rotated relative to the stationary boss 16. The pellets which are thus trapped within the measuring chamber above the piston head 6 are eventually expelled through the nozzle 15 in their original form. Figures 3, 4 and 5 illustrate progressively the condition which takes place when the rearward edge 24a of the mouth 22 approaches the sharp forward edge 25a of the hopper. The clearance between the forward edge 24a of the floor of the recess and the internal wall of the boss 16 is slightly less than the diameter of any of the pellets which are contained in the hopper and any pellets which are resting on the floor of the recess during the period of rotation of the valve in which the recess 30 is exposed to the hopper mouth (see Fig. 4) will engage the forward edge 25a of the hopper mouth and any of such pellets which project above the circumferential path of the external surface of the valve will either be lightly and gradually pressed downwardly into the measuring chamber within the valve body so as to clear the hopper edge 25a or will gradually be pushed upwardly into the hopper mouth as the depth of the recess gradually diminishes when the front edge 24a has proceeded beyond the front edge 25a of the hopper mouth. It will be noted that the pellets are free to be moved up or down the sloped sideways of the recess as the edge 24a approaches the forward edge 25a of the hopper mouth and any pellets which are resting near hopper edge 25a and are projecting to any considerable extent above the circumferential path defined by the external cylindrical surface of the valve will be gradually elevated into the hopper mouth as set forth hereinbefore and none of the pellets are severed or otherwise mutilated as the tail end of the recess eventually proceeds beyond the forward edge 25a of the hopper mouth. The forward edge 24a of the recess is preferably rounded into the measuring chamber to eliminate any sharp edge.

I claim:

1. Apparatus for non-mutilating measurement of spherical shot for firearm cartridges, comprising: a casing including a transverse bearing portion having an internal cylindrical bearing wall, having a discharge opening in the lower side of said bearing wall, and having a hopper opening in the upper side thereof; a hopper supported by said casing and communicating with said hopper opening for delivering shot therethrough; a valve rotatably mounted in said bearing; stop means for limiting the rotation of said valve to less than 360° of movement and for arresting the valve at charging and discharge positions respectively; and means for imparting rotary movements to said valve, consisting in a forward delivery movement from the charging position to the discharge position, and a return loading movement from the discharge position to the charging position; said valve having a cylindrical outer wall closely fitted to said internal bearing wall, having a measuring chamber with a mouth in its said outer wall, positioned for communication with said hopper and opening when the valve is in the charging position and for communication with said discharge opening when in said discharge position, and said valve having in its said outer wall a recess extending circumferentially from said mouth in the direction of said return movement of the valve; said measuring chamber being of relatively large proportions and said recess being relatively long in relation to the shot diameter; said recess having a forward end of maximum depth opening into said measuring chamber and being of gradually decreasing depth toward its rear end, with said rear end merging smoothly with the said outer wall of the valve, the bottom of said recess having a low inclination such as to lift excess shot into the hopper opening without jamming such shot against the forward edge of the hopper opening in the forward movement of the valve.

2. Apparatus as defined in claim 1, wherein said valve has a rounded surface joining the bottom of said forward end of the recess to the adjacent portion of the wall of said measuring chamber.

3. Apparatus as defined in claim 1, wherein the ratios of measuring chamber diameter and recess length to shot diameter are in excess of 5:1.

4. Apparatus as defined in claim 1, wherein the inclination of said recess bottom has a length-depth ratio of over 5:1.

5. Apparatus as defined in claim 1, wherein said valve cylinder has a cylindrical chamber in one end of which said measuring chamber is defined; and including a piston fitted in said cylindrical chamber and providing the bottom of said measuring chamber; and means for adjusting said piston axially in said cylinder so as to adjust the volume of said measuring chamber.

6. Apparatus as defined in claim 1, wherein said valve cylinder has a cylindrical chamber in one end of which said measuring chamber is defined; and including a piston fitted in said cylindrical chamber and providing the bottom of said measuring chamber; and means for adjusting said piston axially in said cylinder so as to adjust the volume of said measuring chamber; said cylinder extending diagonally from the periphery of the valve through one end thereof; and said adjusting means comprising a threaded stem attached to said piston; an indicator sleeve mounted in the end of said cylinder and projecting therefrom, said sleeve having scale indicia thereon; said stem having a threaded connection with said sleeve and extending therethrough; and a knob attached to the outer end of said stem and having a skirt telescoped over said sleeve, the forward end of said skirt cooperating with said scale indicia to indicate volume in said measuring chamber.

References Cited in the file of this patent

UNITED STATES PATENTS 1,815,321     Martin                 July 21, 1931
2,440,846     Cannon               May 4, 1948